Patented Mar. 2, 1943

2,312,750

UNITED STATES PATENT OFFICE 2,312,750

SULPHURIZED ADDITION AGENT FOR LUBRICANTS AND LUBRICANTS CONTAINING THE SAME

Charles A. Cohen, Elizabeth, N. J., assignor, by mesne assignments, to Jasco, Incorporated, a corporation of Louisiana No Drawing. Application August 16, 1938, Serial No. 225,145

15 Claims. (Cl. 252—48)

The present invention relates to improvements in lubricants and more specifically to sulphurized addition agents for lubricants and to lubricants containing the same. The invention will be fully understood from the following disclosure.

Addition agents for lubricating oils have been previously made by sulphurizing fats, fatty oils and hydrocarbon materials with free sulphur by heating at an elevated temperature, and while such products have been used for many years and are still in use, they are not wholly satisfactory because the sulphurization is accompanied by side reactions such as cracking, polymerization and the like which give rise to inactive constituents and darkly colored bodies some of which may be merely useless while others are decidedly objectionable.

It has now been found that certain hydrocarbons, specifically polymers of low molecular weight olefins, particularly those having less than six carbon atoms, such as ethylene, propylene, the butylenes and amylenes, are superior materials for sulphurization. Of these materials the most satisfactory are the polymers of isobutylene and isoamylene in that these materials instead of cracking merely depolymerize to a certain extent during the sulphurization treatment and therefore give rise to cleaner and more desirable products.

The polymers which are disclosed above, and particularly polymers of isoolefins, boil above 100° C., and preferably from say 150 to 275° C., said polymers having molecular weights essentially below 1000. These materials may be made by polymerization of various olefins or mixed olefins using catalysts such as sulphuric or phosphoric acid, aluminum chloride, zinc chloride, boron fluoride and other similar active halide catalysts of the Friedel Crafts type. In addition to these, various siliceous catalysts may also be used such a fuller's earth or clays, especially clays activated by treatment with mineral acids such as sulphuric, phosphoric, hydrochloric or hydrofluoric. Co-polymers, also suitable for use in this invention, are formed by the polymerization of mixture of olefins, preferably of an isoolefin such as isobutylene with the other olefins, such as normal propenes, butenes or pentenes, of the same or a different number of carbon atoms per molecule. The particular methods of producing the polymers and co-polymers are well known and form no part of the present invention.

This invention deals with the sulphurization of the polymers described above and to the sulphurized products and lubricants containing the same. A suitable method for conducting the sulphurization is by heating the polymer or mixture of polymers with free sulphur to an elevated temperature and maintaining the temperature for a prolonged period. Sulphurization begins at about 180° C. and is quite vigorous within the range from 200 to 250° C. The time of heating is governed by the temperature, lower temperatures requiring a longer time, but ordinarily it should not be in excess of 15 minutes at the upper end of the temperature range given above, and the preferred temperature range of 180 to 200° C., is more or less required. The sulphur combines with the hydrocarbon polymer quite readily with an evolution of hydrogen sulphide.

The product produced above may be blown to eliminate hydrogen sulphide, washed and low boiling constituents may be evaporated or distilled off with steam. In many cases a small amount of sulphur is present, not having reacted and this may be separated by filtration or otherwise, and after this is done the filtrate is stable and sulphur does not precipitate or settle out.

The polymer described above may also be sulphurized by other suitable methods; for example, they may be heated with sulphur halides, such as sulphur monochloride and sulphur dichloride. The resulting sulphurized polymer will contain small amounts of chlorine, and may be used in this form in lubricating compositions in which the halide is not objectionable. The sulphurized polymer may also be refined by treatment with alcoholic alkali to remove the halide.

The sulphurized products may be used as mild extreme pressure agents and for this purpose are added to the oily vehicle in proportion of about 2% to 15%, although this depends to some extent upon the concentration of sulphur in the agent itself. It is usually preferable to provide at least 0.1 to 2% of sulphur in the final product, so that if the agent contains about 10% of sulphur, one would ordinarily add at least 2% to the oil in order to give it mild extreme pressure properties. If the agent contains only 5% sulphur, then of course more must be added.

The sulphurized products described heretofore are also useful as oxidation inhibitors and are especially active at elevated temperatures of the order of 100° C. For this purpose 1% is usually effective, that is to say of an addition agent which contains about 10% sulphur. In other words, the amount of polymer added should be sufficient to provide at least 0.1% to 0.2% of combined sulphur in the finished oil.

The present materials may be used as the sole blending agents or they may be added to the lubricant with other ingredients to serve other purposes. They are useful agents to be added to leaded oils, that is to say lubricants containing lead oleate, lead naphthenate, sulphonate or other heavy metal soaps. They also may be added along with oiliness agents, pour depressants, lubricating oil dyes or agents to give fluorescence. They may be used in conjunction with any other anti-oxidants or with thickeners, sediment dispersers and the like.

The following examples may be considered to fully illustrate my invention:

Example I

Isobutylene polymer was distilled so as to segregate a fraction boiling between 175 and 260° C. To 150 cc. of this polymer was added 30 grams of sulphur and the mixture was heated on an oil bath in a reflux condenser at 180° C., for a period of one hour. Hydrogen sulphide was evolved during the heating and when the product was cooled it was filtered so as to remove traces of unreacted sulphur. The product showed a total sulphur content of 11.16%.

Example II

2% of the sulphurized polymer prepared as indicated in Example I was added to a lubricating oil SAE 20 and the product was tested on the Mougey machine. The product carried a load of 21,000 pounds per square inch before the pin was sheared, indicating failure at that point. Unblended oil of the same type was found to carry only 5,000 pounds per square inch before failing.

Example III

1% of the sulphurized polymer prepared in Example I was blended in another oil grade SAE 20 and was subjected to an oxidation test. In this test a 10 cc. sample of oil was maintained continuously at 200° C. and oxygen bubbled continuously through the oil. At fifteen minute intervals, the amount of oxygen absorbed was measured by difference. The unblended oil was tested at the same time, both samples giving the following results:

| Time intervals | Cc. oxygen absorbed/10 cc. oil/15 minute intervals | |
|---|---|---|
| | Blank oil | Blank oil + sulphurized polymer |
| 1 | 103 | 11 |
| 2 | 213 | 12 |
| 3 | 107 | 12 |
| 4 | | 11 |

The present invention is not to be limited by any theory of the mechanism of the polymerization or sulphurization reactions nor to any particular polymerization or sulphurization procedure, but only to the following claims in which it is desired to claim all novelty inherent in the invention.

I claim:

1. An improved lubricating oil addition agent comprising a polymer of a mono-olefin boiling within the range of 100° C. to 275° C., sulphurized by heating with free sulphur between 180° C. and 200° C. for a sufficient period of time to bring about reaction.

2. An improved addition agent for lubricants comprising a polymer of a mono-olefin boiling between 150° C. and 275° C., sulphurized by heating with free sulphur between 180° C. and 200° C. for a sufficient period of time to bring about reaction.

3. An improved lubricating oil addition agent comprising a polymer of a mono-olefin boiling within the range of 100° C. to 275° C., sulphurized by treatment with a sulphur halide.

4. An improved addition agent for lubricants comprising a sulphurized, distillable polymer of a mono-olefin of less than 6 carbon atoms, said polymer being a distillate boiling between 100° C. and 275° C.

5. An improved addition agent for lubricants comprising a sulphurized mono-olefin polymer soluble in lubricating oils and prepared by boiling a mono-olefin polymer distillate in the presence of free sulphur at a temperature between about 180° C. and 200° C. for a sufficient period of time to bring about a sulphurization reaction.

6. An improved addition agent for lubricants comprising a sulphurized distillable polymer of a normally gaseous mono-olefin, said polymer boiling above 100° C. and mainly in the range of about 150° C. to 275° C.

7. An improved addition agent for lubricants comprising a sulphurized distillable polymer of propylene, said polymer boiling above 100° C. but not substantially above 275° C.

8. An improved addition agent for lubricants comprising a sulphurized polymer of an iso-olefin having less than 6 carbon atoms, said polymer boiling above 100° C. but not substantially above 275° C.

9. An improved addition agent for lubricants comprising a sulphurized distillable polymer of isobutylene, said polymer boiling above 100° C. but not substantially above 275° C.

10. An improved addition agent for lubricants comprising a sulphurized distillable copolymer of normally gaseous mono-olefins, said copolymer boiling above 100° C. and mainly in the range of about 150° C. to 275° C.

11. An improved lubricant comprising a hydrocarbon lubricating oil in a small proportion of a sulphurized distillable polymer of a normally gaseous mono-olefin so as to incorporate into the lubricant at least 0.1% of combined sulphur, said distillable polymer boiling above about 100° C. and mainly in the range of about 150° C. to 275° C.

12. An improved lubricant comprising a hydrocarbon lubricating oil and a sulphurized distillable copolymer of normally gaseous mono-olefins in a proportion to incorporate into the lubricant at least 0.1% sulphur, said distillable copolymer boiling above about 100° C. but not substantially above 275° C.

13. An improved lubricant comprising a hydrocarbon lubricating oil and a small proportion of a sulphurized distillable polymer of isobutylene, said polymer of isobutylene boiling in the range of about 150° C. to about 275° C.

14. An improved lubricating oil addition agent comprising a polymer of a mono-olefin boiling within the range of 100° C. to 275° C., sulphurized by treatment with a sulphur halide and then refined by treatment with an alcoholic alkali to remove halide.

15. An improved lubricating oil addition agent comprising a polymer of a mono-olefin boiling within the range of 100° C. to 275° C., sulphurized by treatment with a sulphur chloride and then refined by treatment with an alcoholic alkali to remove chlorine.

CHARLES A. COHEN.